United States Patent
Jones et al.

(10) Patent No.: US 6,388,223 B2
(45) Date of Patent: May 14, 2002

(54) POST-CAST EDM METHOD FOR REDUCING THE THICKNESS OF A TURBINE NOZZLE WALL

(75) Inventors: Raymond Joseph Jones, Duanesburg; Parvangada Ganapathy Bojappa, Schenectady; Francis Lawrence Kirkpatrick, Galway; Margaret Jones Schotsch, Clifton Park; Rajiv Rajan, Guilderland; Bin Wei, Mechanicville, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/741,767

(22) Filed: Dec. 21, 2000

Related U.S. Application Data (63) Continuation of application No. 09/324,403, filed on Jun. 2, 1999, now abandoned.

(51) Int. Cl.[7] .............................. B23H 9/10; B23H 7/02
(52) U.S. Cl. ............................ 219/69.17; 219/69.12; 416/97 R
(58) Field of Search ..................... 219/69.17, 69.12; 204/224 M; 29/527.6, 889.72, 889.721; 416/97 R (56) References Cited

U.S. PATENT DOCUMENTS

| | | | |
|---|---|---|---|
| 3,044,745 A | 7/1962 | Stark .................... | 29/889.721 |
| 3,156,808 A | * 11/1964 | Davies et al. | |
| 3,920,947 A | 11/1975 | Wachtell et al. ........ | 219/69.17 |
| 4,601,638 A | 7/1986 | Hill et al. ............... | 416/97 R |
| 5,152,059 A | 10/1992 | Midgley ............... | 29/889.721 |
| 5,820,337 A | 10/1998 | Jackson et al. ......... | 416/97 R |

FOREIGN PATENT DOCUMENTS

| | | |
|---|---|---|
| GB | 2211775 | 7/1989 |
| SU | 542008 | 3/1977 |

OTHER PUBLICATIONS

"39th GE Turbine State–of–the–Art Technology Seminar", Tab 1, ""F" Technology—the First Half–Million Operating Hours", H. E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivatives Gas Turbines—Design and Operating Features", M. W. Horner, Aug. 1996.

(List continued on next page.)

*Primary Examiner*—Geoffrey S. Evans
(74) *Attorney, Agent, or Firm*—Nixon & Vanderhye (57) ABSTRACT

A post-cast EDM process is used to remove material from the interior surface of a nozzle vane cavity of a turbine. A thin electrode is passed through the cavity between opposite ends of the nozzle vane and displaced along the interior nozzle wall to remove the material along a predetermined path, thus reducing the thickness of the wall between the cavity and the external surface of the nozzle. In another form, an EDM process employing a profile as an electrode is disposed in the cavity and advanced against the wall to remove material from the wall until the final wall thickness is achieved, with the interior wall surface being complementary to the profile surface.

6 Claims, 5 Drawing Sheets

OTHER PUBLICATIONS

"39th GE Turbine State–of–the–Art Technology Seminar", Tab 7, "Advance Gas Turbine Materials and Coatings", P. W. Schilke, Aug. 1996.

"39th GE Turbine State–of–the–Art Technology Seminar", Tab 8, "Dry Low $NO_X$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al., Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug., 1996.

"39th GE Turbine State–of–the–Art Technology Seminar", Tab 37, "GE Combined Cycle Product Line and Performanc", Chase, et al., Aug., 1996.

"39th GE Turbine State–of–the–Art Technology Seminar", Tab 38, "GE Combined Cycle Experience", Maslak et al., Aug., 1996.

"39th GE Turbine State–of–the–Art Technology Seminar", Tab 39, "Single–Shaft Combined Cycle Power Generation Systems", Tomlinson et al., Aug., 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at Power Gen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier"paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivatives Products" Gas Turbines, Brochure, 1998.

"MS7001H/MS9001H Gas Turbine, gepower.com website for PowerGen Europe" June. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H"Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D. W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinghouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $NO_X$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al., pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting"vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II," The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505 Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_X$ Turbines, Ben T. Zinn, pp. 253–264, Nov., 1996

"Proceedings of the Advanced Turbine Systems Annual Program Review Meeting", "Life Prediction of Advanced Materials for Gas Turbine Application", Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine— High Efficiency, Low Cost of Electricity and Low Emissions", Roger Schonewald and Patrick Marolda, (no date available).

"Testing Program Results Validate GE's H Gas Turbine— High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Numbers: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Numbers: DOE/MC/31176—5340.

"Utility Advanced Turbine System (ATS) Technology Readiness Testing and Pre–Commercial Demonstration— Phase 3", Document #486132, Apr. 1–Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration— Phase 3", Document #587906, Jul. 1,–Sep. 30, 1995, Publication Date, Dec. 31, 1995, Report Numbers: DOE/MC31176—5339.

"Utility Advanced Turbine System (ATS) Technology Readiness Testing and Pre–Commercial Demonstration", Document #666277, Apr. 1–Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Numbers: DE—FC21–95MC31176–23.

"Utility Advanced Turbine System (ATS) Technology Readiness Testing:", Document #656823, Jan. 1–Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Numbers: DE–FC21–95MC311760–20.

"Utility Advanced Turbine Systems (ATS) Technology Readiness Testing", Document #1348, Apr. 1–Jun. 29, 1998, Publication Date Oct. 29, 1998, Report Numbers DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

POST-CAST EDM METHOD FOR REDUCING THE THICKNESS OF A TURBINE NOZZLE WALL

This application is a continuation of application Ser. No. 09/324,403, filed Jun. 2, 1999, now abandoned, the entire content of which is hereby incorporated by reference in this application.

This invention was made with Government support under Contract No. DE-FC21-95MC31176 awarded by the Department of Energy. The government has certain right in this invention.

TECHNICAL FIELD

The present invention relates to a method of using electrodischarge machining apparatus for reducing the thickness of turbine nozzle walls and particularly to a post-cast operation using EDM apparatus to remove material from an interior wall of a cavity extending within and between opposite ends of the nozzle to reduce thermal stresses and improve casting yields.

BACKGROUND OF THE INVENTION

In gas turbine designs, axially spaced annular arrays of nozzles form the nozzle stages of the turbine and each array is comprised of nozzle segments arranged circumferentially about the axis of the turbine rotor. Each nozzle segment includes one or more vanes and inner and outer band sections preferably integrally formed of a cast material, for example, a nickel-based alloy. Cavities are cast in the nozzle vane(s) between the band sections for flowing a cooling medium to cool the nozzles. It will be appreciated that a temperature differential exists between the thermal medium flowing in the nozzle cavity and the hot gases of combustion flowing along the hot gas path of the turbine. That temperature differential causes thermal stresses in the material of the nozzle. By reducing the wall thickness between the interior surface of the cavity and the exterior surface of the nozzle and particularly adjacent the leading edge of the nozzle, these thermal stresses caused by the temperature differentials can be minimized. Thin-walled investment castings for nozzles are, however, difficult to manufacture. Tolerance control, as well as material soundness are effected by the wall thickness. Generally, the thinner the wall, the more difficult it is to cast the nozzle, resulting in reduced casting yields. Accordingly, there has developed a need for a process for reducing the wall thickness of turbine nozzles, which not only reduces thermal stresses but which also improves casting yields.

BRIEF SUMMARY OF THE INVENTION

In accordance with a preferred embodiment of the present invention, there is provided a method of removing material from the interior wall of the turbine nozzle to reduce the nozzle wall thickness and hence the thermal induced stresses, while improving casting yields. Particularly, a post-cast electrodischarge machining process is used to remove material from the inner wall of the nozzle cavity. In a preferred embodiment, the EDM process employs a thin electrode disposed within the cavity of the nozzle and movable along the interior wall of the cavity to remove material and hence reduce the wall thickness to a desired thickness. By performing this machining operation subsequent to casting the nozzle, casting tolerance control and material soundness are vastly improved, resulting in increased casting yields, while simultaneously the desired reduction in thermal stresses is obtained by the resulting reduced wall thickness.

In another preferred embodiment of the present invention, an EDM process using an electrode in the form of a profile and a plunge cut can also be employed. In this embodiment, a profile having a surface in conformance with a final contour of the interior wall surface of the cavity is applied against the interior wall of the cavity. As the profile is advanced against the interior cavity wall, material is removed such that the surface of the profile and the interior wall surface become substantially complementary. The profile advance continues until the desired wall thickness is obtained.

In both preferred embodiments, a roughened interior wall surface may also be formed. For example, protuberances may be formed on the electrode surface to provide a roughened thin electrode may be used whereby the movement of the roughened electrode along the interior wall of the cavity forms a final interior wall surface with a complementary roughened surface. The profile similarly may have a roughened surface such that the final contour of the interior wall surface of the cavity will be complementarily roughened similarly as the roughened surface of the profile.

In a preferred embodiment according to the present invention, there is provided a method of forming a thin-walled nozzle for a gas turbine wherein the nozzle has a cavity opening between radial inner and outer opposite ends of the nozzle, comprising the steps of casting the nozzle containing the cavity and removing cast material along a post-cast interior wall of the cavity using an electrodischarge machining apparatus including an electrode to form a final interior wall surface, thereby reducing the thickness of the wall between an exterior surface of the nozzle and the final interior wall surface of the cavity.

DETAILED DESCRIPTION OF THE INVENTION

Figure 1:
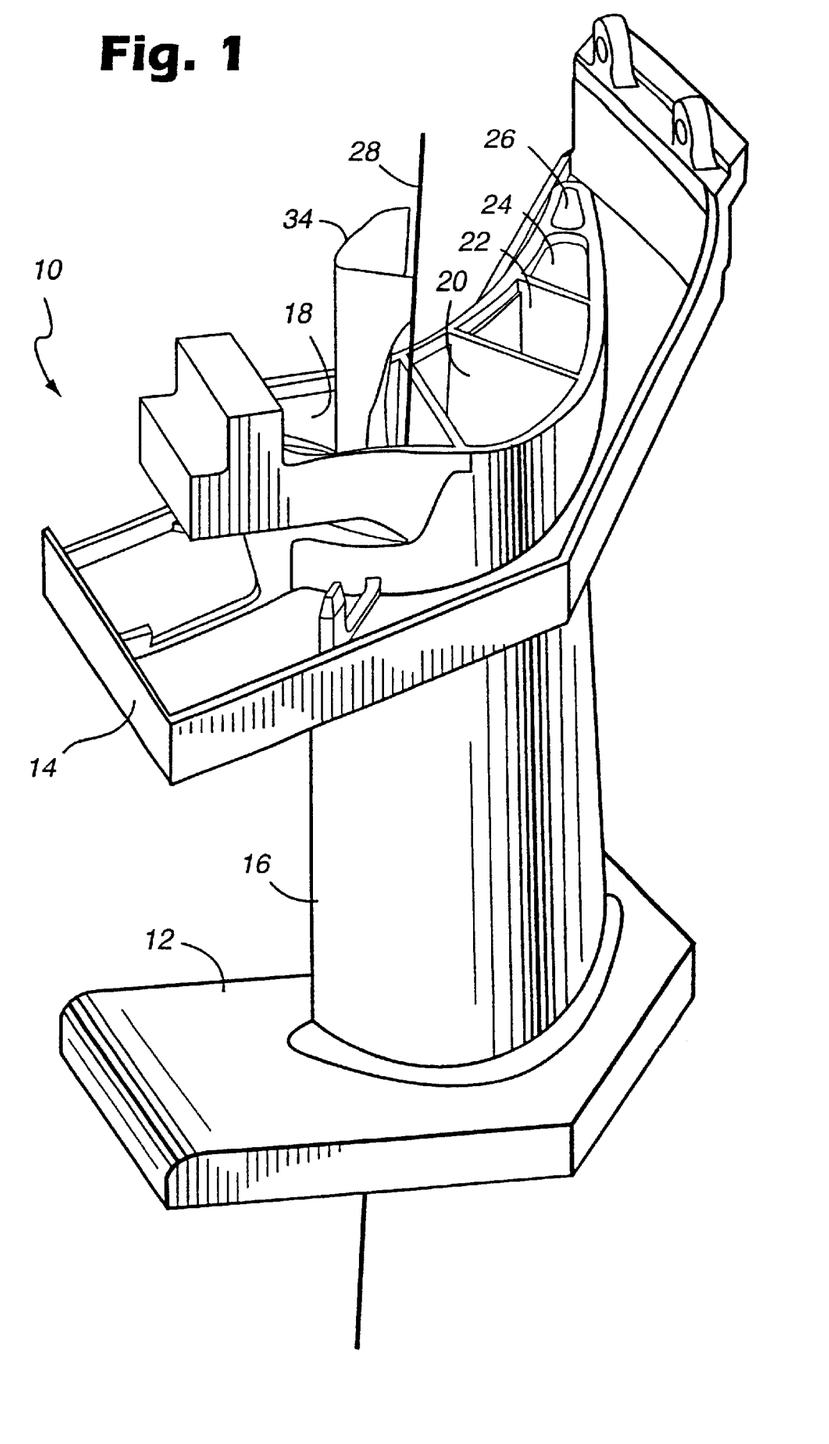
FIG. 1 is a perspective view of a nozzle segment illustrating an electrode of an electrodischarge machining apparatus in position for removing material from the interior cavity of a nozzle vane of the segment.

Referring to FIG. 1, there is illustrated a nozzle segment, generally designated 10, having inner and outer band sections 12 and 14, respectively, adjacent opposite ends of a single nozzle vane 16. It will be appreciated that the illustrated nozzle segment forms one of a plurality of nozzle segments arranged in a circumferential array thereof about a rotor axis to form a nozzle stage of a turbine with the inner and outer band sections 12 and 14, respectively, forming portions of the inner and outer bands of the nozzle stage. Also, while a single vane 16 is illustrated between the inner and outer band sections 12 and 14, respectively, it will be appreciated that two or more vanes may be disposed between the band sections to form, for example, a vane doublet or triplet. As illustrated, the nozzle vane 16, as well as the inner and outer band sections 12 and 14, have internal cavities which extend the length of the vane. For example, as illustrated in FIG. 1, a leading edge cavity 18 is illustrated forward of intermediate cavities 20, 22, 24 and a trailing edge cavity 26. While not forming a part of this invention, it will be appreciated that the cavities provide passages for flowing a thermal medium for cooling the inner and outer bands and vanes which are exposed to the hot gases of combustion flowing along the hot gas path through the turbine. For example, air or steam or both air and steam may be passed through respective cavities to cool the bands and nozzles.

The nozzle segments 10 are formed of a cast material, preferably a nickel alloy. It will be appreciated that thermal stresses in the nozzles can be minimized by reducing the thickness of the wall exposed to hot gases of combustion and the cooling medium flowing through cavities and this is particularly true with respect to the wall about the leading edge of the vane. It will be appreciated that tolerances and wall thickness controls become increasingly more difficult as the wall thicknesses of the castings are decreased, resulting in reduced casting yields. In accordance with a preferred embodiment of the present invention, improved casting yields, as well as reduced wall thickness, particularly between the outer surface of the leading edge and the interior wall surface of the leading edge cavity, can be accomplished by removing material from the inside surface of the cavity wall by a post-cast electrodischarge machining method.

Figure 2:
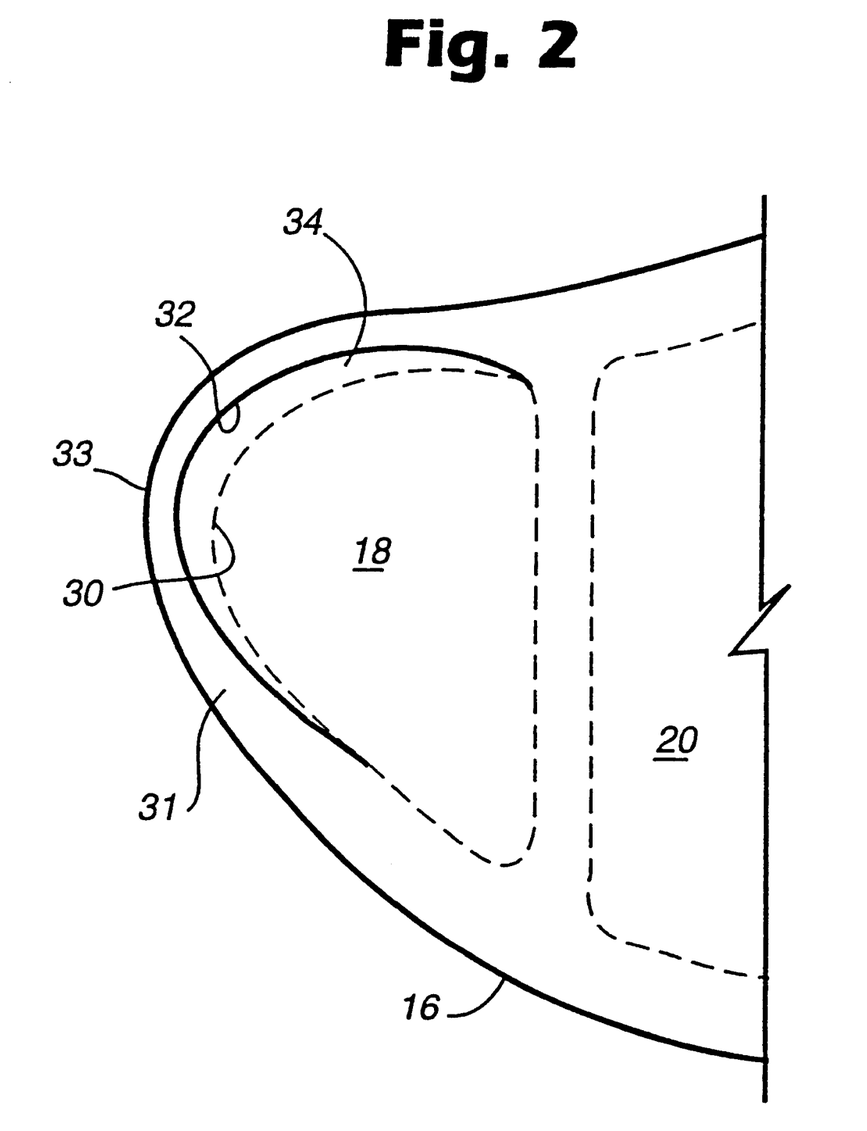
FIG. 2 is a fragmentary schematic illustration of the leading edge cavity of the vane illustrating the interior wall of the cavity before and after the machining process by the dashed and full-line positions, respectively.

Particularly, and referring to FIGS. 1 and 2, and in a preferred form of the present invention, an electrode 28 (FIG. 1), e.g., a thin rod, forming part of an electrodischarge machining apparatus is passed into a cavity of the vane 16 between its opposite ends, e.g., through the inner and outer band sections 12 and 14, respectively, and the leading edge cavity 18.

Electrodischarge machining apparatus is per se conventional. In the present application of such apparatus, it will be appreciated that the thin electrode 28 is fixtured at opposite ends and is preferably robotically movable to follow a predetermined path along wall 31 of the cast cavity, for example, cavity 18. As illustrated in FIG. 2, the wall 31 is cast and has a substantial thickness between its cast interior wall surface 30 and exterior wall surface 33 at the leading edge of the vane 16. The cast wall thickness is indicated by the distance between the outer wall surface 33 and the dashed line 30 in FIG. 2. To reduce the thickness of that wall, the thin electrode 28 is passed through the cavity 18 and moved to transcribe a surface corresponding to the desired inner wall surface, indicated in FIG. 2 by the full line 32, hence forming the desired wall thickness. As the thin electrode 28 is displaced along that desired path, the material of the inner wall of the cavity is cut and may be removed as a single piece, for example, the removed material piece 34 illustrated in FIG. 1. Thus, it will be appreciated that the thin electrode 28 transcribes a path corresponding to the desired inner wall surface 32 thereby cutting along the wall 31 of the cavity 18, with the result that the desired thin-wall configuration is formed post-cast.

Figure 3:
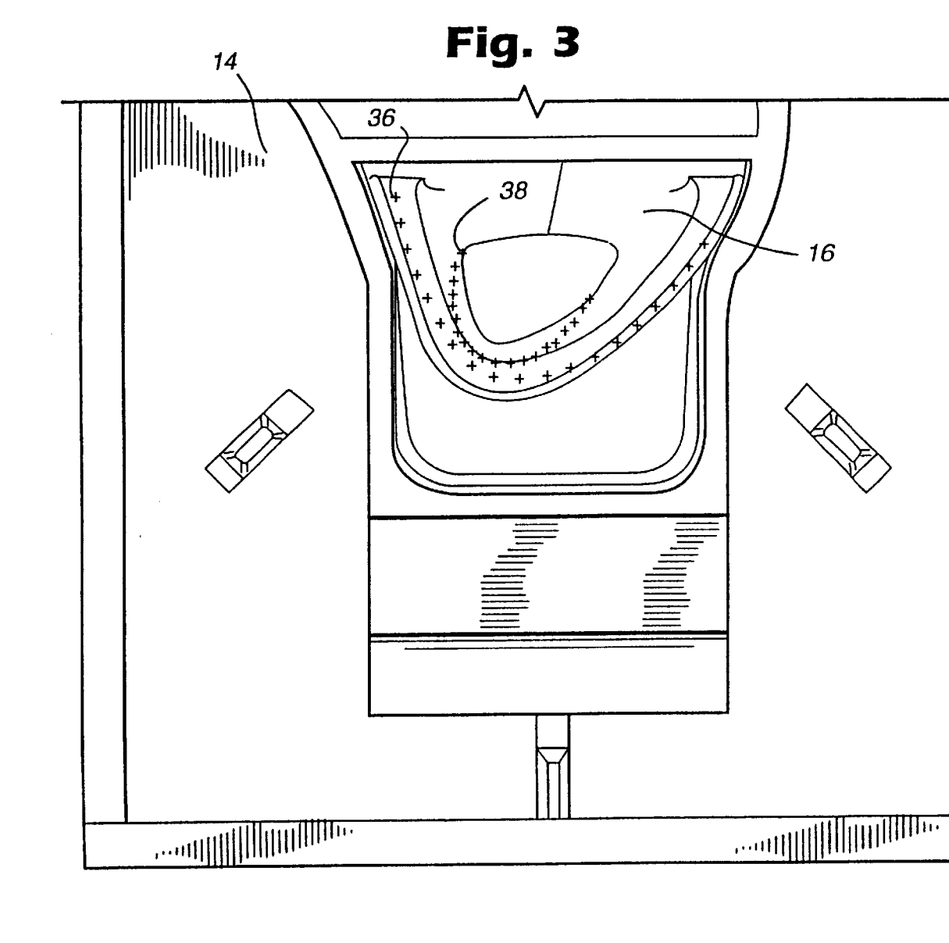
FIG. 3 is a fragmentary plan view illustrating the outer band of the segment and the interior of the leading edge cavity of the vane with datum points illustrating the material to be removed.

Referring to FIG. 3, the path of movement of the electrode 28 along the wall 31 is indicated by the datum points 36 and 38 in FIG. 3, at the respective upper and lower ends of the vanes or external to the vanes. By passing the electrode sequentially through the datum points 36 and 38, the desired compound curved surface can be formed along the inside wall of the cavity. It will be appreciated that the electrode 28 extends linearly and maintains its linear extent as it is displaced along the cavity wall.

Figure 4:
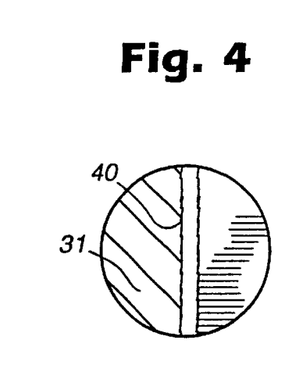
FIG. 4 is an enlarged fragmentary cross-sectional view illustrating an electrode of an EDM apparatus for forming roughened surfaces along the interior wall of the cavity.

It is known that heat transfer characteristics can be improved by using roughened surfaces, for example, between a cooling medium and a surface to be cooled. Consequently, it is desirable to roughen the resulting interior wall surface 32 of the cavity as the wall thickness is being reduced. To accomplish this, the thin electrode 28 may have a roughened surface 40, as illustrated in FIG. 4. As the thin electrode is displaced along the predetermined path, the interior wall surface is roughened complementary to the roughened surface of the wire electrode for enhanced thermal effectiveness.

Figure 5:
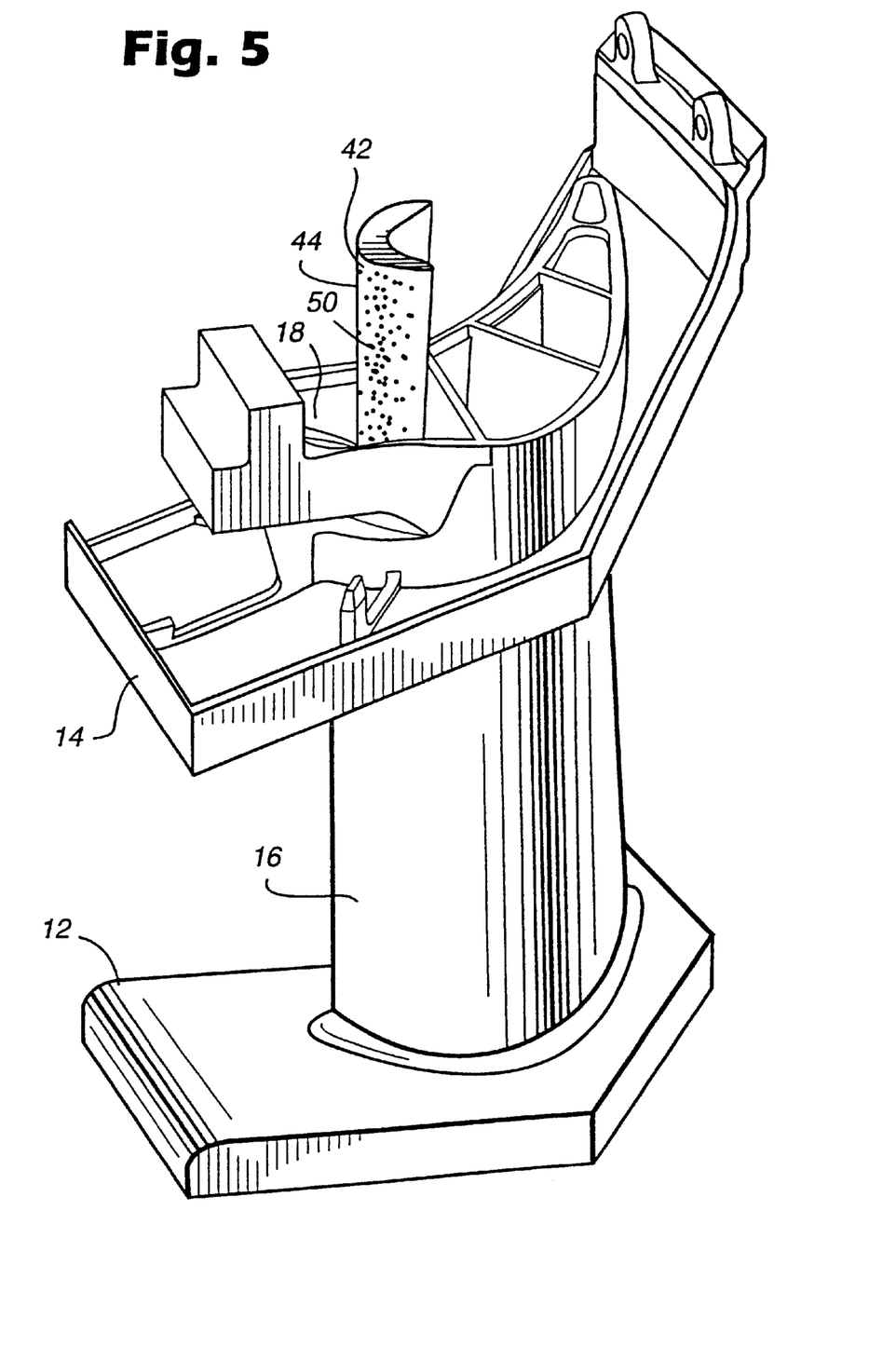
FIG. 5 is a view similar to FIG. 1 illustrating an EDM process using an electrode in the form of a profile for plunge cutting the interior cavity wall.
Figure 6A:
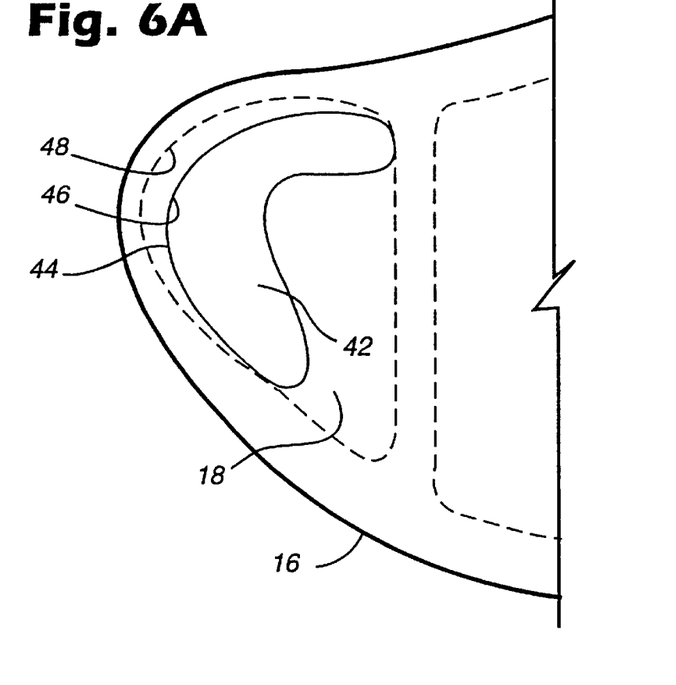
FIGS. 6A and 6B are illustrations of a plunge cut using the profile before and after the cut, respectively.
Figure 6B:
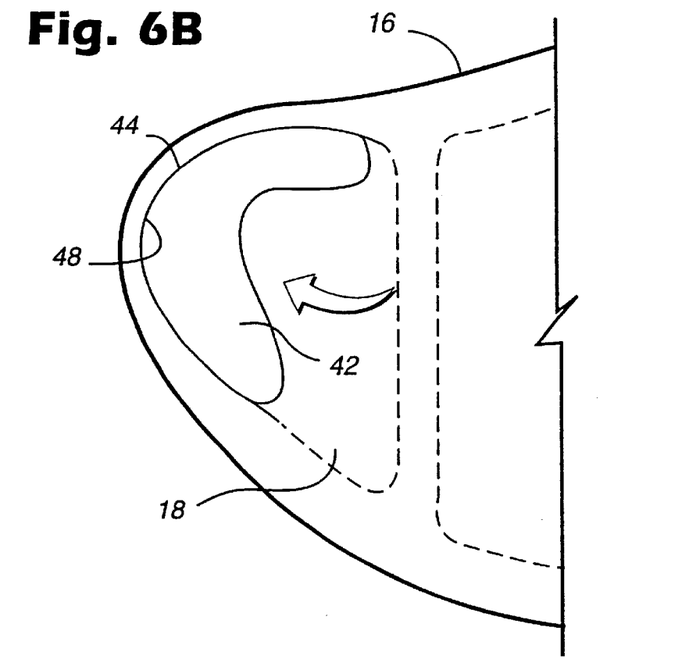

Referring now to FIGS. 5, 6A and 6B, an EDM plunge cut process is used. Particularly, an electrode in the form of a profile, is used in lieu of a thin electrode. As illustrated in FIG. 5, the profile 42 forms the electrode of the EDM apparatus and extends through the cavity 18 similarly as the thin electrode 28. The profile 42 has a forward surface 44 which corresponds to the final desired interior wall surface of the inner cavity after the EDM process is complete. Thus, by inserting the profile 42 into the cavity 18, the forward surface 44 of the profile 42 is brought to bear against the existing cast interior wall surface 46 of the cavity 18 as illustrated in FIG. 6A. By advancing the profile 42 toward the desired interior wall surface configuration 48, the final wall surface 48 may be formed. That is, by advancing the profile 42 as illustrated by the arrow in FIG. 6B into engagement with the cast interior wall surface 46 and continuing to advance the profile 42, the material is cut away until the forward surface 44 of the profile 42 and the interior wall surface 48 are complementary to one another and in the appropriate location within the cavity defining the desired wall thickness. It will also be appreciated that the profile 42 may have a roughened surface 50 (FIG. 5) similarly as the thin electrode such that the final interior wall surface 48 of the cavity may have a roughened surface complementary to the roughened surface of the profile for improved heat transfer.

As a consequence of the disclosed methods, casting yields are vastly improved. Concurrently, the wall thickness can be controlled to close tolerances to reduce thermal stresses, as well as improve heat transfer.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming a thin-walled nozzle for a gas turbine wherein the nozzle has a cavity adjacent a leading edge of said nozzle and opening between radial inner and outer opposite ends of the nozzle, comprising the steps of:

casting the nozzle containing the cavity; and removing cast material along a post-cast interior wall of said cavity opposite said leading edge using an electrodischarge machining apparatus including an electrode to form a final interior wall surface, thereby reducing the thickness of the wall between an exterior surface of the nozzle and the final interior wall surface of the said cavity.

2. A method of forming a thin-walled nozzle for a gas turbine wherein the nozzle has a cavity opening between radial inner and outer opposite ends of the nozzle, comprising the steps of:

casting the nozzle containing the cavity;

removing cast material along a post-cast interior wall of said cavity using an electrodischarge machining apparatus including an electrode having a roughened surface to form a final interior wall surface; and applying the electrode to the interior wall to form a generally complementary roughened interior wall surface in said cavity, thereby reducing the thickness of the wall between an exterior surface of the nozzle and the final interior wall surface of the said cavity.

3. A method of forming a thin-walled nozzle for a gas turbine wherein the nozzle has a cavity opening between radial inner and outer opposite ends of the nozzle. comprising the steps of:

casting the nozzle containing the cavity;

removing cast material along a post-cast interior wall of said cavity using an electrodischarge machining apparatus including an electrode having a roughened surface to form a final interior wall surface; and applying the electrode to the interior wall to form a generally complementary roughened interior wall surface in said cavity, thereby reducing the thickness of the wall between an exterior surface of the nozzle and the final interior wall surface of the said cavity.

4. A method of forming a thin-walled nozzle for a gas turbine wherein the nozzle has a cavity opening between radial inner and outer opposite ends of the nozzle, comprising the steps of:

casting the nozzle containing the cavity;

removing cast material along a post-cast interior wall of said cavity using an electrodischarge machining apparatus including an electrode in the form of a profile to form a final interior wall surface;

forming a surface of the profile in conformance to a final contour of the interior wall surface of said cavity; and wherein the step of removing includes applying the profile to the interior wall of said cavity to remove the cast material until the surface of the profile and the interior wall surface are substantially complementary to one another, thereby reducing the thickness of the wall between an exterior surface of the nozzle and the final interior wall surface of the said cavity.

5. A method according to claim 4 including forming a roughened surface on the profile surface and forming a complementary roughened interior wall surface of the cavity upon application of the profile to the interior wall.

6. A method of forming a thin-walled nozzle for a gas turbine wherein the nozzle has a cavity lying adjacent a leading edge of said nozzle opening between radial inner and outer opposite ends of the nozzle, comprising the steps of:

casting the nozzle containing the cavity;

removing cast material along a post-cast interior wall of said cavity using an electrodischarge machining apparatus including a thin electrode having a roughened surface to form a final interior wall surface about the leading edge cavity; and guiding the roughened thin electrode along the interior wall of the cavity opposite said leading edge to form a generally complementary roughened interior wall surface in said leading edge cavity, thereby reducing the thickness of the wall between an exterior surface of the nozzle and the final interior wall surface of the said cavity.

* * * * *